(12) United States Patent
Martinez Ortigosa et al.

(10) Patent No.: US 10,903,555 B2
(45) Date of Patent: Jan. 26, 2021

(54) ANTENNA SYSTEM AND SIDE MIRROR FOR A VEHICLE INCORPORATING SAID ANTENNA

(71) Applicant: Advanced Automotive Antennas, S.L.U., Barcelona (ES)

(72) Inventors: Enrique Martinez Ortigosa, Barcelona (ES); Evgenii Filatov, Barcelona (ES); Ramiro Quintero Illera, Barcelona (ES)

(73) Assignee: Advanced Automotive Antennas, S.L.U., Barcelona (ES)

( * ) Notice: Subject to any disclaimer, the term of this patent is extended or adjusted under 35 U.S.C. 154(b) by 39 days.

(21) Appl. No.: 16/227,760

(22) Filed: Dec. 20, 2018

(65) Prior Publication Data
US 2019/0190137 A1    Jun. 20, 2019

(30) Foreign Application Priority Data

Dec. 20, 2017  (EP) .................................. 17382871

(51) Int. Cl.
*H01Q 1/32* (2006.01)
*H01Q 19/10* (2006.01)
(Continued)

(52) U.S. Cl.
CPC ............ *H01Q 1/3266* (2013.01); *B60R 1/12* (2013.01); *H01P 3/081* (2013.01); *H01Q 1/3283* (2013.01);
(Continued)

(58) Field of Classification Search
CPC ..... B60R 1/12; B60R 2001/1261; H01P 3/08; H01P 3/081; H01Q 19/10; H01Q 1/32;
(Continued)

(56) References Cited

U.S. PATENT DOCUMENTS

| | | | | |
|---|---|---|---|---|
| 5,835,057 | A | * 11/1998 | van Heyningen | ... H01Q 1/3216 342/359 |
| 6,008,773 | A | * 12/1999 | Matsuoka | ............ H01Q 19/108 343/700 MS |

(Continued)

FOREIGN PATENT DOCUMENTS

| | | |
|---|---|---|
| EP | 2833479 A1 | 2/2015 |
| GB | 765465 A | 1/1957 |

OTHER PUBLICATIONS

Extended European Search Report for Application No. 17382871.6, dated Jun. 22, 2018, 8 pages.

*Primary Examiner* — Tho G Phan
(74) *Attorney, Agent, or Firm* — Brooks Kushman, P.C.

(57) ABSTRACT

Antenna system adapted for integration in side mirrors of a vehicle. The antenna system includes two radiating conductors and a reflector coplanarly disposed on a same dielectric substrate of a printed circuit board. The radiating conductors are connected to the reflector through transmission lines electromagnetically coupled to a frequency band of operation. In order to optimize the radiating of the antenna system in a 180° sector that covers one lateral of the vehicle, the reflector is separated from the two radiating conductors by a distance included between 0.3 times and one time the central wavelength; and the reflector is less than 6 times wider than the radiating conductors.

19 Claims, 6 Drawing Sheets

(51) Int. Cl.
| | |
|---|---|
| *H01Q 9/16* | (2006.01) |
| *H01Q 9/06* | (2006.01) |
| *B60R 1/12* | (2006.01) |
| *H01P 3/08* | (2006.01) |
| *H01Q 9/28* | (2006.01) |
| *H01Q 9/04* | (2006.01) |
| *H01Q 1/38* | (2006.01) |

(52) U.S. Cl.
CPC ............ *H01Q 1/38* (2013.01); *H01Q 9/0407* (2013.01); *H01Q 9/065* (2013.01); *H01Q 9/16* (2013.01); *H01Q 9/285* (2013.01); *H01Q 19/10* (2013.01); *B60R 2001/1261* (2013.01)

(58) Field of Classification Search
CPC ...... H01Q 1/3266; H01Q 1/3283; H01Q 9/06; H01Q 9/065; H01Q 9/16; H01Q 1/38; H01Q 9/04; H01Q 9/0407; H01Q 9/28; H01Q 9/285
See application file for complete search history.

(56) References Cited

U.S. PATENT DOCUMENTS

| | | | |
|---|---|---|---|
| 6,046,703 A | 4/2000 | Wang et al. | |
| 6,307,524 B1 * | 10/2001 | Britain | H01Q 19/30 343/795 |
| 6,342,867 B1 * | 1/2002 | Bell | H01Q 19/108 343/795 |
| 9,425,495 B2 * | 8/2016 | Walker | H01Q 1/007 |
| 9,653,787 B2 * | 5/2017 | Martinez-Ortigosa | H01Q 1/3275 |
| 2020/0101889 A1 * | 4/2020 | Iwai | H01Q 1/44 |

\* cited by examiner

ANTENNA SYSTEM AND SIDE MIRROR FOR A VEHICLE INCORPORATING SAID ANTENNA

CROSS-REFERENCE TO RELATED APPLICATIONS

This application claims priority to European Patent Application Serial No. EP 17382871.6 filed Dec. 20, 2017, the disclosure of which is hereby incorporated in its entirety by reference herein.

TECHNICAL FIELD

The present disclosure has its application within the automotive and telecommunication industry and, especially, it relates to antenna systems for vehicles. A general object of the disclosure is to provide an antenna system for radio-frequency transmission and reception in all bands available for vehicular wireless communication applications.

A more specific object of the disclosure is to provide an antenna system robust enough to allow small position and/or orientation modifications during the use of the vehicle, while featuring a small size that enables integration inside vehicles side mirrors.

BACKGROUND

Transmitting and receiving information in moving vehicles has proven to be a challenging task for the automotive industry. Traditional approaches were based in the provision of external antennas in different parts of the vehicle, such as the roof or the rear window. However, these solutions, often based on monopoles, are greatly affected by the outer vehicle morphology, such as as the roof size, shape and tilt. As a consequence, some angles around the vehicle aren't adequately covered, hence lacking the omnidirectionality typically desired in these scenarios.

Furthermore, traditional antennas present limitations in their operational frequency ranges. Originally, the main focus of automotive communications was to cover the bands used by amplitude modulation (AM) and frequency modulation (FM) broadcasts. However, the number and variety of services offered to vehicle users through wireless communications has rapidly escalated. Nowadays, these service include positioning and routing systems; radio and television broadcast; voice and data communications; internet access; automated signalling between Internet of Things (IoT) devices; or coordination of commercial transport fleets; to name a few. This broad offer also implies that the antenna systems integrated in vehicles are required to cover greater frequency bands in an omnidirectional manner, and do such with a robustness that guarantees the communication quality required by the most demanding services.

Several approaches have been proposed in order to enhance the capabilities of vehicular antenna systems. For example, the European patent application EP 2 833 479 A1 discloses an antenna system, adapted to be installed on the front of the vehicle roof, which combines two directional antennas with opposite radiation directions. At least one of the antennas comprises a dipole disposed on a dielectric substrate of a printed circuit board (PCB), connected to a reflector plane through transmission lines. In order to provide the desired radiation pattern, the reflector plane is arranged perpendicularly to the PCB plane in which the dipole is disposed. The design prevents radiated power to be diverted into side lobes, enhancing overall system performance.

However, there is still the need of further antenna miniaturization, enabling omnidirectional schemes in any kind of vehicles while preserving high-performance. Antenna size reduction is sought after in order to facilitate integration in different parts of the vehicle, without compromising aesthetics, aerodynamics, nor the driver's visual range. It is also desirable that the antenna system provides radio-frequency transmission and reception in all bands available for vehicular wireless. Finally, it is desirable that the performance of the antenna system is robust enough as to allow small position and/or orientation modifications during the use of the vehicle, while maintaining the quality of the transmission.

SUMMARY

The current disclosure solves all the aforementioned shortcomings of the prior art, by providing a directive coplanar antenna system with a dipole and a reflector coplanarly disposed on a same dielectric substrate of a printed circuit board (PCB). The geometrical properties of said antenna system are adapted to guarantee a gain over a given threshold in a 180° degrees region, while preserving a small size that enables integration in the side mirrors of a vehicle.

In a first aspect of the disclosure, an antenna system for a vehicle is disclosed. The antenna system comprises a dipole formed by two radiating conductors, connected to a reflector through transmission lines. All these elements (i.e. the two radiating conductors, the reflector and the transmission lines) are coplanar, that is, they are disposed on the same dielectric substrate of a printed circuit board. Said dielectric substrate is disposed on top of a ground plane, which is shorted to the radiating conductors through one of the transmission lines. The combination of the dipole and the reflector results in a directive antenna with a radiation that exceeds a given gain threshold (set during design) in an angular range of at least 180°, hence suitable to cover one side of a vehicle when installed in a side mirror.

In order to maximize the antenna system directivity and gain in an operational frequency range with a given central wavelength, some geometrical properties are applied to the disposition of the two radiating conductors and the reflector:

The reflector is separated from the two radiating conductors by a distance within a range of 0.3 times and 1 time the central wavelength. Preferably, said distance between the reflector and the two radiating conductors is within a range of 0.5 times and 0.8 times the central wavelength, and more preferably, between 0.6 times and 0.7 times the central wavelength.

The reflector width, that is, for a rectangular-shaped reflector, the shorter dimension of the rectangle, is preferably equal or lesser than 0.5 times the central wavelength. More preferably, said reflector width is equal or lesser than 0.24 times the central wavelength, and even more preferably, equal or lesser than 0.2 times the central wavelength.

The ratio between the reflector width and the dipole width (i.e. the shorter dimension of the area covered by each of the two radiating conductors) is less than 6. That is, the reflector is less than 6 times wider than the radiating conductors. More preferably, said ratio is between 0.8 and 1.8, and even more preferably, within the range 1.2 and 1.6, with an optimal value of approximately 1.4.

According to two preferred options, the reflector can either be disposed in parallel or perpendicularly to the two radiating conductors.

Preferably, the transmission lines are either implemented with microstrip lines or circulators, although any other type of transmission lines known in the state of the art may be used alternatively. An unbalance feeding antenna scheme with mictrostrip lines is preferably implemented. That is, a first microstrip line extends through a feeding line into an antenna feeding point, located near the reflector. The reflector is shorted to a ground plane and isolated from the feeding line. A second microstrip line, disposed in parallel to the first microstrip line is shorted to the ground plane. Each microstrip line connects to a radiating conductor, and has a length of a one-fourth of an effective wavelength within the frequency band of operation of the antenna system, preferably a central wavelength of said frequency band.

Another aspect of the disclosure refers to side mirrors, incorporating an antenna system as the one previously described. Note that the term "side mirror" is used in this context to refer to any external protuberance or support element on a side of the vehicle, regardless of whether said support element comprises a reflective glass or not. For example, in some vehicles, the side mirror may comprise a camera, with or without an accompanying reflective surface.

The antenna system is preferably integrated in an outer area of the side mirror, that is, a region of the side mirror furthest away from the main body of the vehicle, although alternative embodiments of the disclosure may incorporate the antenna system in other positions, such as a support element of the side mirrors. This region provides minimum distortion to the radiation diagram due to distortions caused by some typical distortive elements of the side mirror, such as a metallic part of a light reflector, a blinker, or a metallic mirror reflector surface. Therefore, in the particular embodiments where any of the aforementioned is present in the side mirror, the antenna system is preferably located in a position that maximizes distance to any metallic part.

The antenna system is preferably disposed keeping the antenna main axis perpendicular to a main axis of the vehicle. That is, the antenna radiation pattern is directed laterally from the vehicle. The PCB of the antenna system can hence be disposed either horizontally or vertically, although the latter is preferred.

The antenna system of the disclosure provides a compact yet high-performance solution that can be implemented in a planar PCB, typically within a 1 mm thickness. This size reduction compared to volumetric approaches known in the state of the art enables its integration in side mirrors, fully covering both sides of the vehicle. Omnidirectional robust communication is provided, simultaneously enabling radio-frequency transmission and reception in all bands demanded by typical wireless. Due to the optimized performance of the antenna system, said omnidirectional communication is maintained even when the antenna is rotated or displaced due to the side mirror movements.

BRIEF DESCRIPTION OF THE DRAWINGS

For the purpose of aiding the understanding of the characteristics of the disclosure, according to a preferred practical embodiment thereof and in order to complement this description, the following figures are attached as an integral part thereof, having an illustrative and non-limiting character.

DETAILED DESCRIPTION

Figure 1:
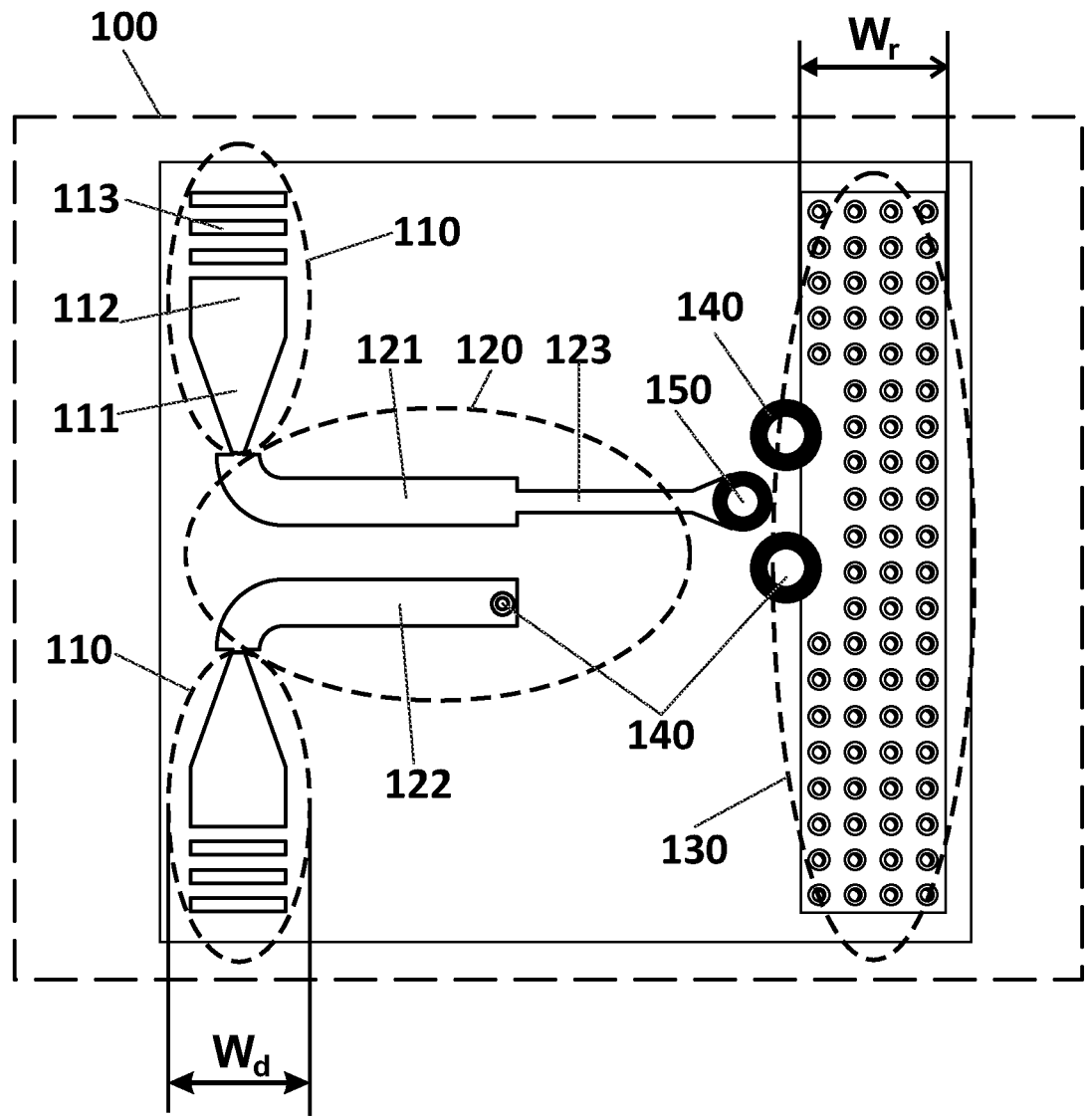
FIG. 1 depicts the main elements integrated in the PCB of the antenna system of the disclosure, according to a preferred embodiment thereof.

FIG. 1 shows a preferred embodiment of the antenna system (100) of the disclosure, which comprises two radiating conductors (110), two transmission lines (120) and a reflector (130), all coplanarly arranged on the same dielectric substrate of a printed circuit board. The dielectric substrate is disposed on a ground plane, being said ground plane shorted to the reflector (130) through a connection (140). As all the elements are implemented using the same PCB layers, the whole antenna system (100) can be integrated in a thickness of a few millimeters, enabling its installation in the side mirrors of a vehicle. Furthermore, the design and disposition of the radiating conductors (110) and the reflector (130) enables full coverage of a 180° angular section, achieving omnidirectional behavior with the combination of only two antenna systems (100).

The antenna system (100) may be implemented with different dipole geometries, such as a bowtie-shaped configuration, an elliptic-shaped configuration, a diamond-shaped configuration, a rectangular-shaped configuration, a rectified horn-shaped configuration or a configuration wherein the radiating conductor (110) is formed by segments spaced at their extremes wherein corresponding opposing angles are formed. In this particular embodiment, each radiating conductor (110) of the dipole is formed by three regions:

A first region (111) in a tapered shape starting at a minimum width ($W_{min}$) which progressively increases up to a total dipole width ($W_d$) along a first length ($L_1$). In this particular non-limiting example, the tapered shape is an isosceles trapezoid. The tapered shape base with the minimum width ($W_{min}$) is connected to the transmission lines (120), whereas the tapered shape base with the total dipole width ($W_d$) is connected to the second region (112).

A second region (112) in the shape of a rectangle, with a constant width substantially equal to the total dipole width ($W_d$), and a second length ($L_2$).

A third region (113) comprising a plurality of rectangular segments, each segment presenting a constant width equal to the total dipole width ($W_d$), and a third length ($L_3$). This third region, which is optional, enables tuning the radiation pattern of the dipole after installation. This is achieved by connecting one or more rectangular segments of the third region (113) to the second region (112), hence modifying the aforementioned second length ($L_2$).

The width of the reflector ($W_r$) has to be lower than six times the total dipole width ($W_d$). More preferably, the reflector (130) is between 0.6 times and 2.6 times wider than the radiating conductors (110), with an optimal ratio of 1.4.

The transmission lines (120) are two parallel microstrip lines disposed substantially perpendicularly to the dipole, that is, perpendicularly to an axis which connects the two radiating conductors (110). A first microstrip line (121) is connected on one end to a first radiating conductor (110), whereas the opposite end extends into a thinner feeding line (123) going in a direction towards the reflector (130), but being isolated from said reflector (130). Said opposite end is connected to a feeding point (150) disposed near the connections (140) used to short the reflector (130). An unbalance feeding antenna scheme is achieved between the feeding point (150) and the connections (140). A second microstrip line (122) is connected on one end to a second radiating conductor (110), whereas the opposite end is directly shorted to the ground plane. Both the first microstrip line (121) and the second microstrip line (122) have a length of one-fourth of an effective wavelength within the frequency band of operation, typically selected as the central wavelength of said frequency band. Note that in other particular embodiments, different microstrip lines geometries and/or different transmission lines (120) such as circulators may be used.

Finally, the reflector (130) is a rectangular region which can be disposed in parallel or perpendicularly to the dipole. For example, for the particular frequency range of 5.85 GHz to 5.925 GHz, the reflector width ($W_r$) is preferably selected below a maximum of 26 mm in order to achieve a minimum gain of 2 dBi. More preferably, for a minimum gain of 4 dBi, the reflector width ($W_r$) is preferably selected below a maximum of 13 mm. Finally, for a minimum gain of 6 dBi, the reflector width ($W_r$) is preferably selected below a maximum of 11 mm.

For the same frequency range of 5.85 GHz to 5.925 GHz, the distance between the reflector (130) and the radiating conductors (110) is preferably selected within the range between 19 mm and 49 mm, achieving a minimum gain of 2 dBi. More preferably, for a 4 dBi minimum gain, said distance is selected between 25 mm and 41 mm. Even more preferably, for a 6 dBi minimum gain, said distance is selected between 30 mm and 36 mm, with an optimal value of 32 mm.

Note that due to the coplanar disposition of the antenna system, the ground plane (130) is not perpendicular to the radiating conductors (110). Therefore, the ground plane (130) does not work as a reflective element, but instead operates in junction with the radiating conductors (110) in order to generate a linear two array antenna elements distribution with directive radiation properties.

As known from general antenna theory, when two antenna array elements are spaced a distance of $d \sim 2\lambda/3$, with equal power incident in both array elements (in this case, the two radiating conductors 110 and the ground plane 130), and a difference of phase near of 180° is implemented by a microstrip balun circuit (in this case, the transmission lines 120), the obtained radiation pattern (Gpattern) is directional, and can be mathematically described by the following formula of a cardioide:

$$G\text{pattern} = (1 - \cos\theta)/2$$

Figure 5:
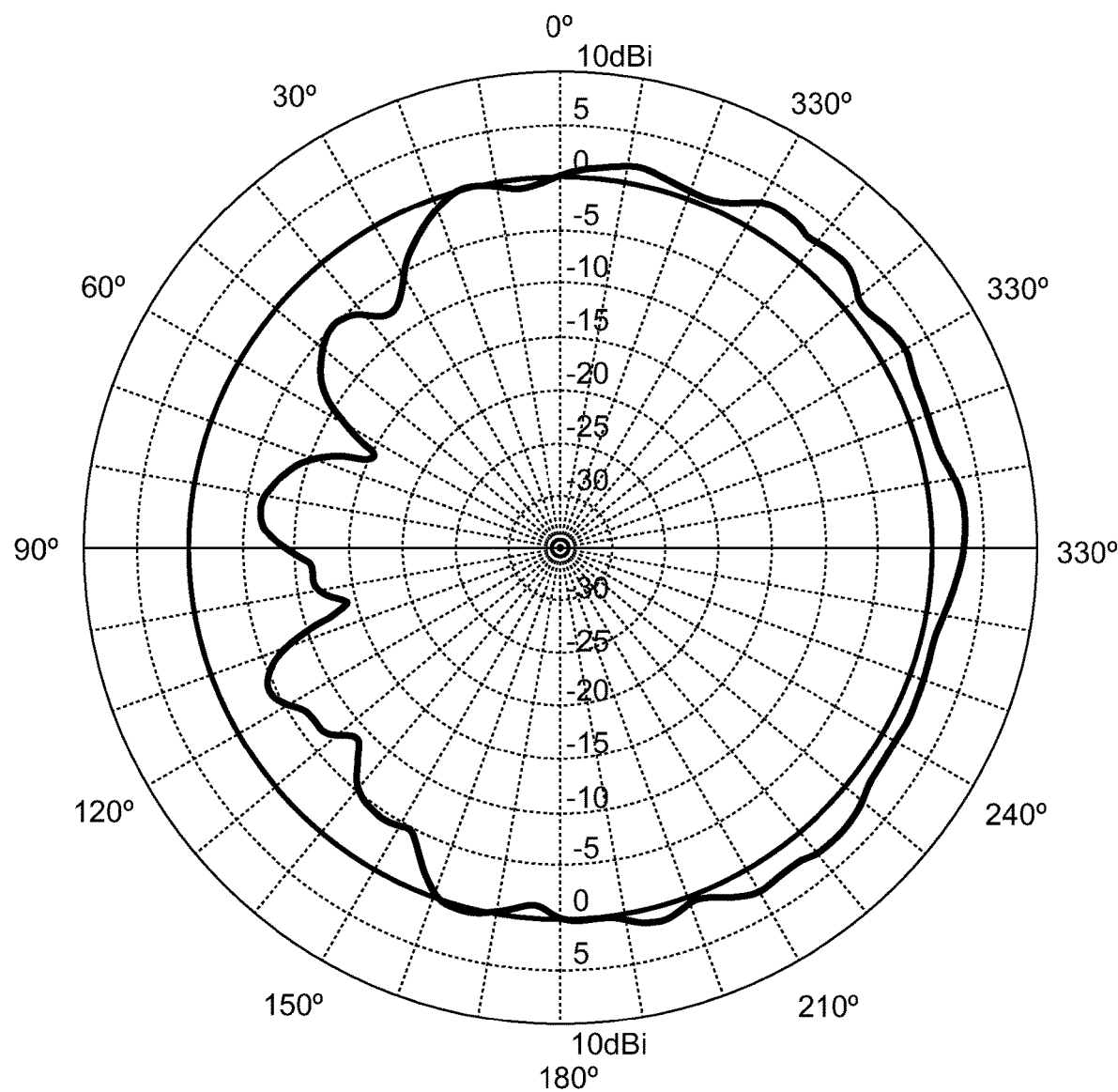
FIG. 5 shows a graph illustrating experimental measurements of the gain pattern of a preferred embodiment of the antenna system of the disclosure.

The achieved radiation pattern is directive with a maximum of radiation on a semisphere region in an angular range of 180° ($-90° < \theta < 90°$), hence suitable to cover one side of a vehicle when installed in a side mirror as shown in the radiation pattern of FIG. 5.

As previously explained, the optimal value of 32 mm for application. Considering a central frequency of operation of 5.9 GHz (for application at the frequency range between 5.85 GHz to 5.925 GHz), and implementing the radiation conductors (110) and the ground plane (130) on a dielectric material of low electrical permittivity ($\varepsilon_{eff} \sim 1$) like an implementation on a free space condition, the optimal distance between conductor (110) and ground plane (130) is computed as:

$$\frac{2 \cdot \lambda}{3} = \frac{2 \cdot c}{3 \cdot f \cdot \sqrt{\varepsilon_{eff}}} = \frac{2 \cdot 3e8}{3 \cdot 5.9e + 9 \cdot \sqrt{1}} \approx 32 \text{ mm}$$

Considering a 5.9 GHz central frequency of operation, and implementing the radiation conductors (110) and the ground plane (130) on a commercial dielectric of higher electrical permittivity ($\varepsilon_{eff} = 4.5$), said optimal distance is modified as:

$$\frac{2 \cdot \lambda}{3} = \frac{2 \cdot c}{3 \cdot f \cdot \sqrt{\varepsilon_{eff}}} = \frac{2 \cdot 3e8}{3 \cdot 5.9e + 9 \cdot \sqrt{4.5}} \approx 16 \text{ mm}$$

Figure 2:
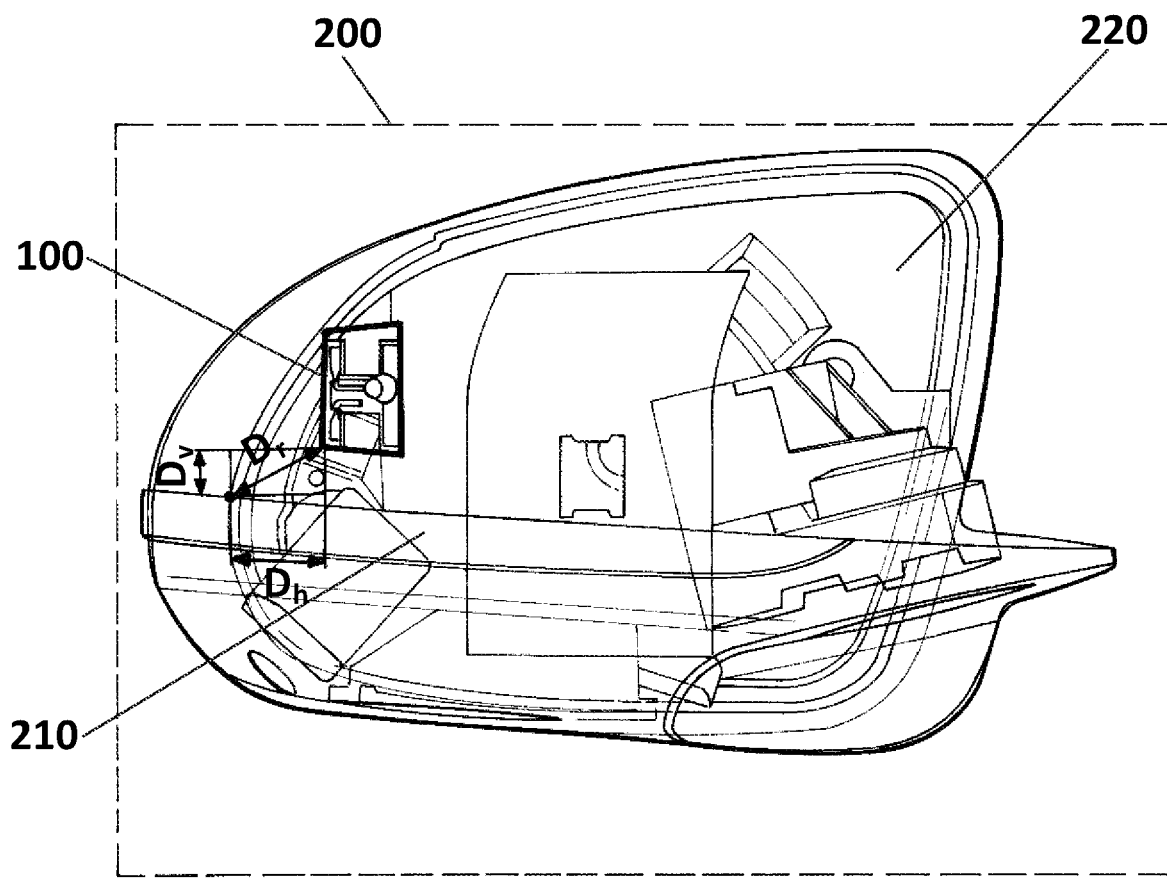
FIGS. 2 and 3 are two views of a side mirror which incorporates the antenna system of the disclosure, according to preferred embodiments thereof.
Figure 3:
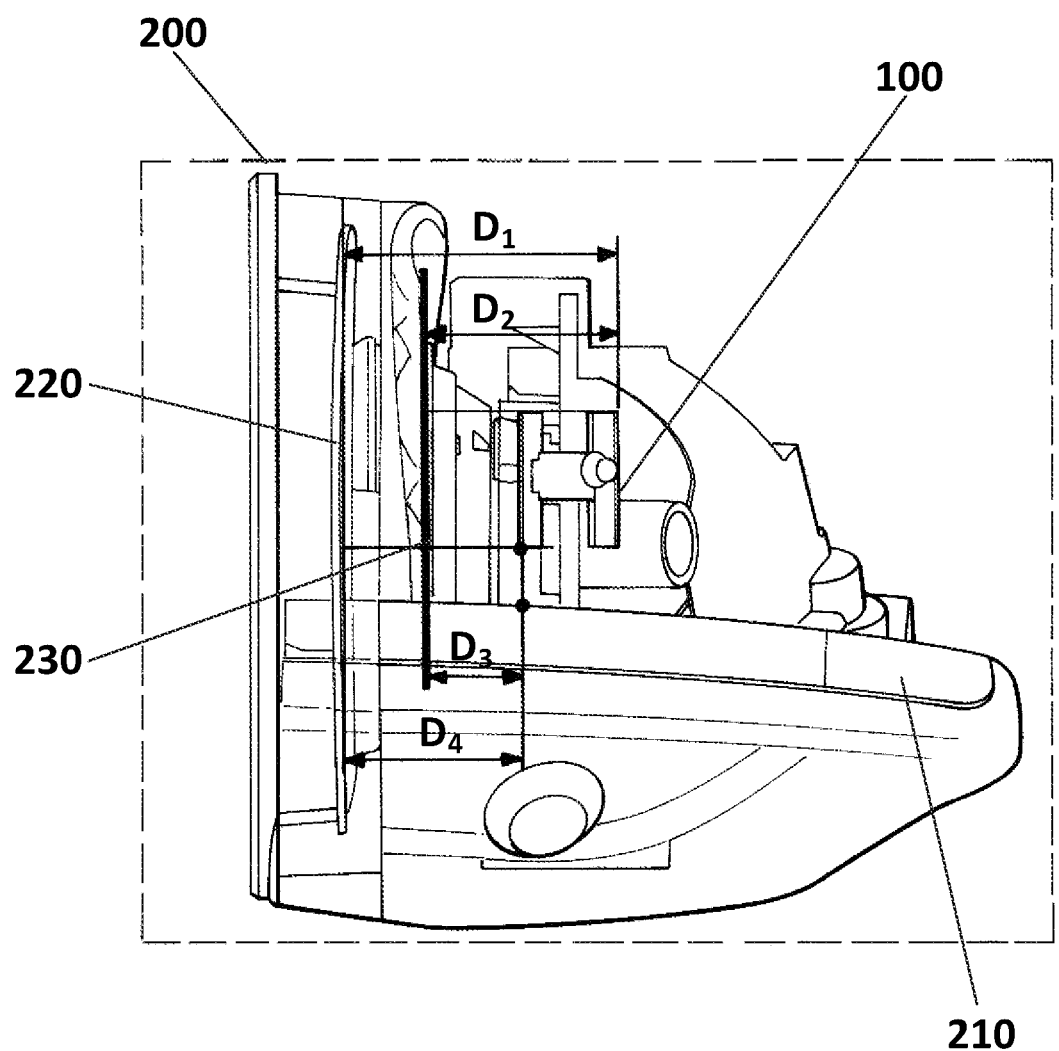

FIGS. 2 and 3 illustrate a preferred embodiment of the side mirror (200) of the disclosure, which incorporates the antenna system (100) previously described.

The side mirror (200) may further incorporate a blinker (210), a mirror glass (220) with its respective metallic mirror reflector surface, and a frame (230). Since the most distortive elements to the radiation pattern of the antenna system (100) is the metallic reflector of the blinker (210) or the metallic mirror reflector surface of the mirror glass, said antenna system (100) is located in an outer region of the side mirror (200) moved as far away as possible from said distortive elements.

In particular, the specific embodiment of FIG. 2 shows that the antenna system (100) is closer to the blinker (210) than the mirror glass (220), and with a vertical distance ($D_v$) between the antenna system (100) and the metallic reflector of the blinker (210) of 11 mm, and a horizontal distance ($D_h$) of 31 mm, adding up to a total distance ($D_t$) of 33 mm.

Although the position of the rest of the elements is not as critical as the position of the blinker (210) or the mirror glass (220), FIG. 3 shows an example of recommended distances between the antenna system (100), the mirror glass (220) and the frame (230):

A first maximum distance ($D_1$) of 50 mm between the mirror glass (220) and the antenna system (100).

A second maximum distance ($D_2$) of 37 mm between the frame (230) and the antenna system (100).

A first minimum distance ($D_3$) of 19 mm between the frame (230) and the antenna system (100).

A second minimum distance ($D_4$) of 32 mm between the mirror glass (220) and the antenna system (100).

Figure 4:
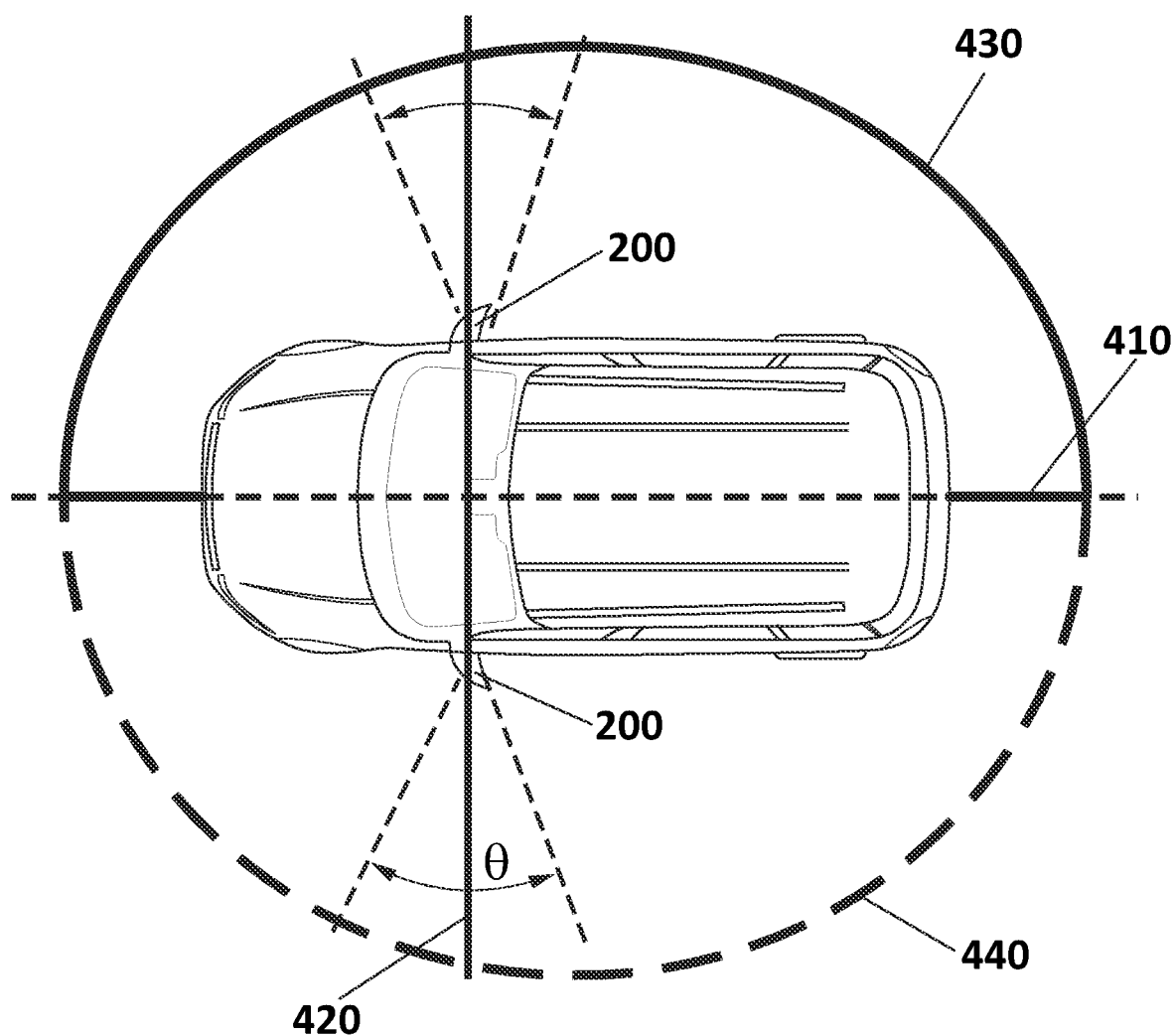
FIG. 4 shows a vehicle which incorporates two antenna systems in its side mirrors, according to a preferred embodiment of the disclosure.

FIG. 4 schematically depicts a preferred embodiment of a vehicle (300) of the disclosure, which incorporates in its side mirrors (200) an antenna system (100) for each side mirror (200), also according to preferred embodiments thereof. If a main axis (410) is defined by the central movement direction of the vehicle (300), and an orthogonal axis (420) is defined perpendicular to said movement direction in a horizontal plane, the antenna systems (100) are preferably disposed facing said orthogonal axis (420) in two opposite directions. Therefore, a first antenna system (100) covers a first lateral region (430) of the vehicle (300), whereas a second antenna system (100) covers a second lateral region (440), thereby obtaining an omnidirectional coverage. Nevertheless, note that small angular deviations (θ) from the ideal orthogonal axis (420) may be induced while still preserving the desired omnidirectional coverage. Said angular deviations (θ) may be induced by the design and morphology of the side mirrors (200), as well as by tilts and rotations of the mirror glass (220) or the same side mirror (200) due to user operation.

FIG. 5 shows experimental measurements of a preferred embodiment of the antenna system (100) of the disclosure, after full integration in the side mirror (200). The radiation pattern presents a gain exceeding 0 dBi in a complete semicircle around the device (that is, for all angles between 180° and 360°), demonstrating that omnidirectional coverage can be achieved by the combination of only two antenna systems.

Note that although the preferred embodiments have been described for the 5.85 GHz to 5.925 GHz, corresponding to Dedicated Short-Range Communications (DSRC) or Vehicle-to-Vehicle and Vehicle-to-Infrastructure (V2X or C2X), the frequency band of operation may be alternatively selected within one of the following ranges: 2.4-2.5 GHz, 3.5-3.6 GHz, 3.6-3.7 GHz or 4.9-5.8 GHz for WiFi communications; and 5.8-6.0 GHz for WiMAX communications. The modification of the frequency band of operation is straightforwardly achieved by updating the dimensions and distances of the PCB elements following the ranges and conditions previously described in this description.

Figure 6:
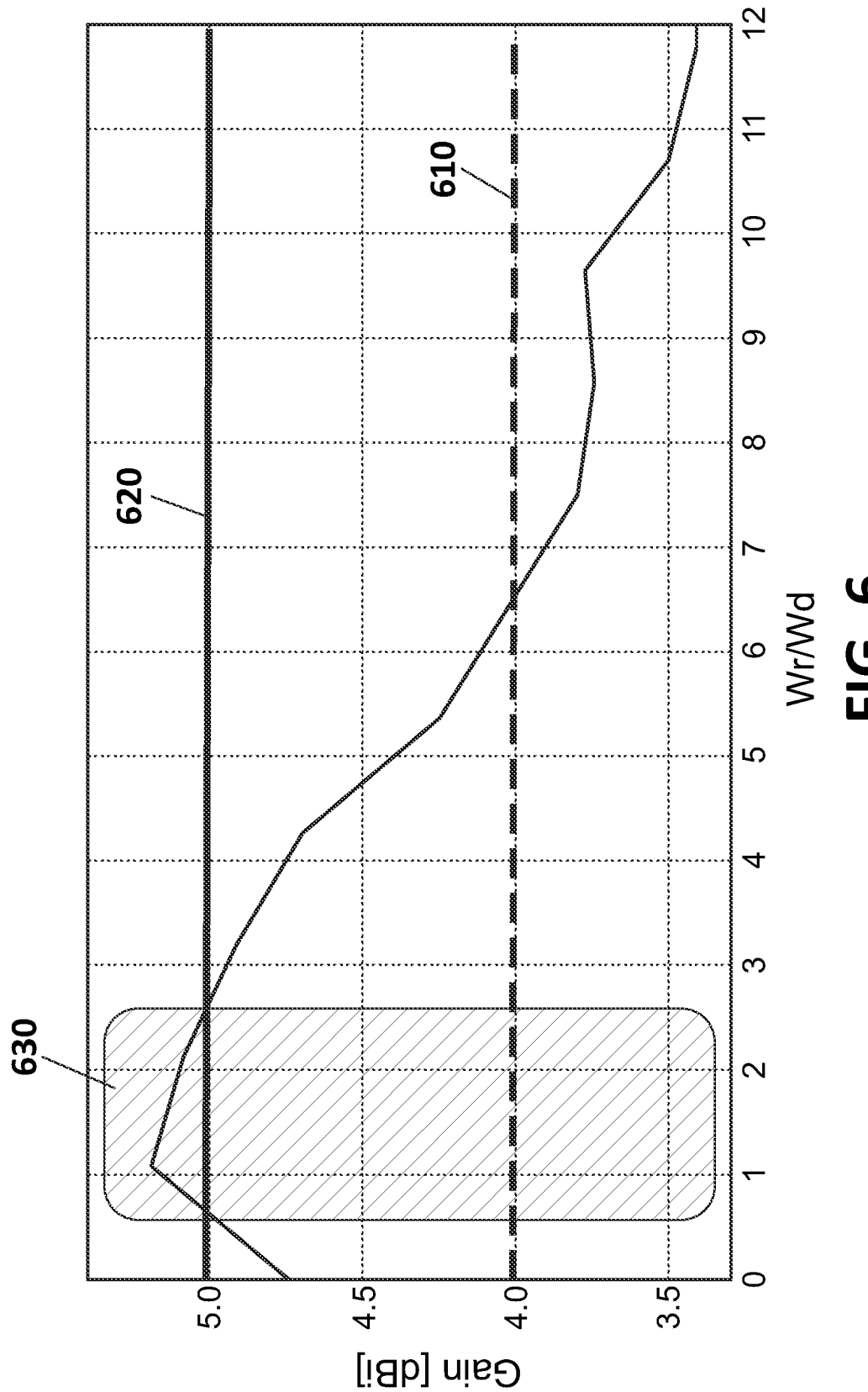
FIG. 6 illustrates an achievable gain as a function of a ratio between reflector width and dipole width, according to a preferred embodiment of the antenna system of the disclosure.

Finally, FIG. 6 illustrates the relation between the antenna gain and the ratio between the radiator width ($W_r$) and the dipole width ($W_d$), for a particular embodiment of the disclosure where the reflector (130) and the two radiating conductors are disposed in parallel. Two target gain threshold are shown: a first threshold (610) at 4 dBi and a second threshold (620) at 5 dBi. The first threshold (610) is exceeded whenever the radiator width ($W_r$) is less than six time larger than the dipole width ($W_d$). The second threshold (620) defines an optimal region (630), that is, an optimal range of width ratios, that for this specific case is comprised between a ratio of 0.6 and 2.6. Note that the particular gain values of each embodiment may vary depending on the exact disposition and geometry of the antenna system components.

What is claimed is:

1. An antenna system for a vehicle, comprising at least two radiating conductors connected to a reflector through transmission lines, wherein transmission lines are electromagnetically matched to a frequency band of operation with a central wavelength (λ), the two radiating conductors and the reflector are coplanarly arranged on a same dielectric substrate of a printed circuit board, wherein the reflector is separated from the two radiating conductors by a distance between 0.3 times and 1 time the central wavelength (λ), and wherein the reflector is less than 6 times wider than the radiating conductors, wherein the transmission lines include a first microstrip line and a second microstrip line, both the first microstrip line and the second microstrip line having a length of an one-fourth of an effective wavelength within the frequency band of operation; wherein the first microstrip line extends into a feeding line in a direction of the reflector, the feeding line being isolated from the reflector and connected to a feeding point and further wherein the second microstrip line is arranged in parallel to the first microstrip line and shorted to a ground plane through a connection.

2. The system according to claim 1, wherein the reflector is separated from the two radiating conductors by a distance between 0.5 times and 0.8 times the central wavelength (λ).

3. The system according to claim 2, wherein the reflector is separated from the two radiating conductors by a distance between 0.6 times and 0.7 times the central wavelength (λ).

4. The system according to claim 1, wherein the reflector is between 0.6 times and 2.6 times wider than the radiating conductors.

5. The system according to claim 1, wherein a reflector width (Wr) is equal or less than 0.5 times the central wavelength (λ).

6. The system according to claim 5, wherein the reflector width (Wr) is equal or less than 0.24 times the central wavelength (λ).

7. The system according to claim 1, wherein the reflector is arranged perpendicularly to the two radiating conductors.

8. The system according to claim 1, wherein the reflector is arranged in parallel to the two radiating conductors.

9. The system according to claim 1, wherein the transmission lines include circulators that feed the two radiating conductors.

10. Antenna system according to claim 1, wherein the two radiating conductors are arranged in at least one of a bowtie-shaped configuration, an elliptic-shaped configuration, a diamond-shaped configuration, a rectangular-shaped configuration, a rectified horn-shaped configuration and a configuration wherein the radiating conductors are formed by segments spaced at their ends wherein corresponding opposing angles are formed.

11. A side mirror for a vehicle, comprising:
an antenna system for a vehicle, including at least two radiating conductors connected to a reflector through transmission lines, wherein the transmission lines are electromagnetically matched to a frequency band of operation with a central wavelength (λ), the two radiating conductors and the reflector are coplanarly arranged on a same dielectric substrate of a printed circuit board, wherein the reflector is separated from the two radiating conductors by a distance between 0.3 times and one time the central wavelength (λ), and wherein the reflector is less than 6 times wider than the radiating conductors, wherein the transmission lines comprise a first microstrip line and a second microstrip line, at least one of the first microstrip line and the second microstrip line having a length of an one-fourth of an effective wavelength within the frequency band of operation; wherein the first microstrip line extends into a feeding line in a direction of the reflector; and further wherein the second microstrip line is arranged in parallel to the first microstrip line and shorted to a ground plane through a connection.

12. The mirror according to claim 11, wherein the antenna system is disposed with a radiation along an orthogonal axis, perpendicular to a main movement axis of the vehicle.

13. The mirror according to claim 12, wherein the printed circuit board of the antenna system is disposed vertically.

14. The mirror according to claim 11, further comprising at least one distortive element to a radiation of the antenna system, the distortive element including at least one of a metallic part of a light reflector, a blinker, and a metallic mirror reflector surface.

15. The mirror according to claim 11, wherein the reflector is separated from the two radiating conductors by a distance between 0.5 times and 0.8 times the central wavelength (λ).

16. The mirror according to claim 15, wherein the reflector is separated from the two radiating conductors by a distance between 0.6 times and 0.7 times the central wavelength (λ).

17. The mirror according to claim 11, wherein the reflector is between 0.6 times and 2.6 times wider than the radiating conductors.

18. The mirror according to claim 11, wherein a reflector width (Wr) is equal or less than 0.5 times the central wavelength ($\lambda$).

19. The system according to claim 18, wherein the reflector width (Wr) is equal or less than 0.24 times the central wavelength ($\lambda$).

* * * * *